2,977,309

LUBRICATING OIL CONTAINING BRANCHED CHAIN ALKYL AMINE DERIVATIVES OF DICARBOXYLIC ACIDS

Kenneth L. Godfrey, St. Albans, and Donald D. Staker, Nitro, W. Va., assignors to Monsanto Chemical Company, St. Louis, Mo., a corporation of Delaware No Drawing. Original application Apr. 21, 1955, Ser. No. 503,009. Divided and this application Nov. 14, 1957, Ser. No. 700,247

4 Claims.  (Cl. 252—51.5)

The present invention relates to new compositions of matter and also to mineral oil compositions containing the new products. The compositions comprising the present invention are formed by the reaction, preferably at between temperatures of 120–160° C., of an alpha-beta dicarboxylic acid containing fewer than 6 carbon atoms or anhydride thereof, with a branched chain primary amine containing at least 10, and preferably, 12 to 15 carbon atoms. However, such amines containing from 18 to 24 carbon atoms have been successfully employed. The desired products, found most effective for use as rust inhibitors of steam turbine oils, are those formed by reacting from 0.5 to 2.0 moles of acid with 1 mole of amine. Moreover, esterification or partial esterification of the carboxyl groups present by means of a long chain alcohol, also results in acceptable products for the use mentioned. The invention will be readily apparent from the discussion and examples that follow.

As suitable and preferred acids found effective as reactants with the disclosed amines, the following group is disclosed:

Malic acid

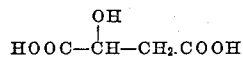

Succinic acid $$HOOC.CH_2.CH_2.COOH$$

Fumaric acid $$HOOC.CH=CH.COOH$$

Maleic acid $$HOOC.CH=CH.COOH \text{ (cis)}$$

Tartaric acid

Itaconic acid

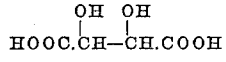

Aspartic acid

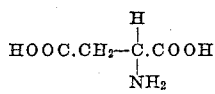

The branched chain amines employed in the present invention preferably are tartiary-alkyl primary amines, as for example Primene 81–R which is a tertiary-alkyl amine containing 12 to 15 carbon atoms and Primeme JMR which is a tertiary-alkyl amine containing 18 to 24 carbon atoms. The use of such amines is essential in order to produce a final product of required oil solubility. Suitable alcohols for esterification of the acid are long chain alcohols such as Ocenol, a mixture of $C_{16}$–$C_{18}$ unsaturated alcohols, tridecanol, oleyl and octyl alcohols.

The preferred reaction products are readily produced as is evidenced by the following typical example for the class claimed hereinafter. Equal moles of malic acid (134.0 parts) and of Primeme 81–R (201 parts of a $C_{12}$–$C_{15}$ tert-alkyl primary amine) were weighed into a 500 cc. three-necked flask, fitted with a thermometer, stirrer and Dean-Stark water trap and condenser. The temperature of the mixture was then raised to 135° C. and a sufficient quantity of benzene added to maintain refluxing at temperature between 135–140° C. This same refluxing temperature was maintained for a period of 16 hours during which time a total of 35.5 grams of water were collected. Thereupon benzene was removed from the reaction mixture by vacuum distillation at about 135° C. and under 20 mm. of mercury pressure. A very viscous amber liquid was obtained with a neutralization number (milligrams of KOH eqivalent to 1 gm. of product) of 155.

Although the above specific example shows equi-molar ratios of acid and amine charged, other ratios between the units of 0.5 to 2.0 moles of acid or anhydride per mole of amine have been employed. Likewise, the temperature of reaction has been varied between 120° and 160° C. Obviously at the lower temperatures shown, a longer reacting period is required to complete the reaction as would be shown by the weight of water evolved. If a product is desired in which partial or complete esterification is effected, the alcohol is added in equimolar ratios with the rest of the charge and the described process followed.

Data set forth in the table below illustrate the results of a number of preparations of various products of the preferred class by the procedure described above.

Table 1

| Molar Ratio of Acid, Amine and Alcohol | Reaction Temp., ° C. | Reaction Time, hours | N.N. | Solubility in Petroleum Ether (5% Conc.) |
|---|---|---|---|---|
| 1 Malic, 1 Primene 81–R | 135–140 | 16.0 | 155 | soluble. |
| 1 Malic, 1 Primene 81–R, 1 Ocenol. | 145 | 7.5 | 59 | clear. |
| 1 Malic, 1 Primene 81–R, 1 Tridecanol. | 140 | 10.5 | 61 | |
| 1 Maleic, 1 Primene 81–R | 140–158 | 24.0 | 130 | |
| 1 Fumaric, 1 Primene 81–R | 145–155 | 2.4 | 114 | soluble. |
| 1 Succinic, 1 Primene 81–R | 145–150 | 24.0 | 128 | cloudy. |
| 1 Fumaric, 2 Primene 81–R | | | 67 | soluble. |
| 1 Maleic Anhydride, 1 Primene 81–R. | 145–160 | 49.0 | 67 | clear. |
| 1 Malic, 1 Primene JMR | 140 | 20.5 | 96 | |
| 1 Tartaric, 1 Primene JMR | 130–135 | 21.0 | 83 | soluble. |
| 1 Malic, 0.5 Primene JMR | 135 | 13.5 | 171 | Do. |
| 1 Malic, 2 Primene JMR | 137–143 | 29.5 | 105 | clear. |

The effectiveness of various products within the scope of the present invention and prepared in the manner hereinbefore described, as rust inhibitors in mineral lubricating oils, for example an oil suitable for use in steam turbines, was determined in accordance with A.S.T.M. Test D 665–52T for determining the rust preventing characteristics of steam turbine oils in the presence of water. In accordance with this test, both synthetic sea water and distilled water are used. The synthetic sea water was prepared as described in the above identified test method. In the test a cylindrical, polished steel specimen is suspended and soaked in 300 cc. of the oil under test at 140° F. for 30 minutes. Thereafter, 30 cc. of synthetic sea water (or 30 cc. of distilled water) are added and the mixture is stirred at 1000 r.p.m. After 24 hours the steel specimen is removed and examined for evidence of rust. The oil containing the inhibitor under test passes the test when there is no evidence of rust on that part of the specimen which hangs below the oil level.

In the test results set forth in Table 2 following, the oils employed were base stocks in commercial use for the formulation of light and heavy steam turbine finished lubricants. The different base oils are designated by the letters A, B, C and D. The base stocks were treated with the indicated percentage by weight of the various products of the preferred type as indicated, which products possess the neutralization number as shown.

This application is a division of U.S. patent application Serial Number 503,009, filed April 21, 1955, now abandoned.

Table 2

| Molar Ratio of Acid/Amine | N.N. | Oil | Conc. percent | Rust Test | | |
|---|---|---|---|---|---|---|
| | | | | Dist. | Sea | Result |
| 1 Malic, 1 Primene 81-R | 188 | A | .06 | | no rust | pass. |
| Do | 188 | B | .06 | | do | Do. |
| Do | 83 | C | .04 | no rust | | Do. |
| Do | 83 | C | .12 | | no rust | Do. |
| Do | 83 | A | .12 | | do | Do. |
| 1 Malic, 2 Primene 81-R | 105 | B | .14 | | do | Do. |
| 1 Malic, 1 Primene JMR | 102 | A | .10 | | light film | borderline. |
| 1 Maleic, 1 Primene 81-R | 130 | A | .06 | | no rust | pass. |
| Do [1] | 43 | C | .04 | no rust | | Do. |
| Do [1] | 43 | D | .12 | | no rust | Do. |
| 1 Fumaric, 1 Primene 81-R [1] | 114 | A | .06 | | do | Do. |
| Do [1] | 40 | C | .04 | no rust | | Do. |
| 1 Maleic anhydride, 1 Primene 81-R | 193 | A | .06 | | light stain | borderline. |
| 1 Succinic, 1 Primene 81-R | 128 | B | .10 | | no rust | pass. |
| 1 Fumaric, 2 Primene 81-R | 67 | A | .10 | | do | Do. |
| 1 Malic, 1 Oleyl alcohol, 1 Primene 81-R | 59 | B | .12 | | do | Do. |

[1] 50% blend with kerosene.

To determine whether or not the addition of the reaction products of this invention to lubricating oils cause the formation of undesirable emulsions, emulsion tests were also carried out on the oil-reaction product mixtures in accordance with the emulsion test for lubricating oils according to Method 320.1.5, Federal Specification VV–L–791d, Federal Stock Catalog Sec. IV, Part 5. According to this test, 40 cc. of the compounded oil and 40 cc. of water are placed in a 100 cc. of graduated cylinder and stirred by suitable means at 1500 r.p.m. for 5 minutes at the prescribed temperature. Separation of the resulting emulsion is observed while the cylinder and contents are kept at the required temperature. The time in minutes for the separation of an emulsion layer of 3 cc. thickness and the time for complete breaking of the emulsion is shown in Table 3. Tests were carried out in distilled and in 1% NaCl solution as indicated, employing the reaction products shown with the turbine base stocks used in the rust tests previously described. In order to meet Navy Specification MIL–L–17331 (Ships) there must not be over 3 cc. of emulsion after 30 minutes standing in the test described. The results follow:

Table 3

| Product Tested | Oil | Water | 3 ml., minutes | Complete Break, minutes |
|---|---|---|---|---|
| Malic-Primene 81-R | C | Dist | 7 | 8 |
| Do | C | Salt | 7 | 8 |
| Do | B | Dist | 15 | 16 |
| Do | B | Salt | 16 | 17 |
| Do | D | Dist | 17 | 19 |
| Do | D | Salt | 17 | 19 |
| Maleic-Primene 81-R | C | Dist | 8 | 9 |
| Do | C | Salt | 9 | 10 |
| Do | D | Dist | 22 | 25 |
| Do | D | Salt | 18 | 20 |
| Fumaric-Primene 81-R | C | Dist | 8 | 10 |
| Do | C | Salt | 7 | 8 |
| Do | D | Dist | 19 | 21 |
| Do | D | Salt | 18 | 20 |
| Do | B | Dist | 15 | 17 |
| Do | B | Salt | 17 | 19 |

The results of the several tests set forth clearly show that the new reaction products of the class described are oil soluble, are effective in protecting a metal against rusting in oil-water contact and do not form continuous oil-water emulsions.

It is intended to cover all changes and modifications of the examples of the invention herein chosen for purposes of disclosure which do not constitute departures from the spirit and scope of the invention.

What is claimed is:

1. A mineral lubricating oil containing from .02–1% by weight of an oil soluble acidic reaction product obtained by reacting a member selected from the group consisting of malic, succinic, fumaric, maleic, tartaric, itaconic and aspartic acids and anhydrides thereof with primary branched chain alkyl amine containing 10–24 carbon atoms, the reaction being conducted within the range of 120–160° C. with from 0.5–2.0 moles of the acidic reagent per mole of amine, and accompanied by formation of by-product water.

2. A mineral lubricating oil containing from .02–1% by weight of an oil soluble acidic reaction product obtained by reacting an alpha, beta-dicarboxylic acid of the structure HOOC—$C_2H_n$—COOH where $n$ is an integer at least 2 but less than 5 with a primary branched chain alkyl amine containing 10–24 carbon atoms, the reaction being conducted within the range of 120–160° C. with from 0.5 to 2.0 moles of the acidic reagent per mole of amine, and accompanied by formation of by-product water.

3. A mineral lubricating oil containing from .02–1% by weight of an oil soluble acidic reaction product obtained by reacting substantially 134 parts by weight of malic acid with substantially 201 parts by weight of a mixture of tertiary alkyl primary amines containing 12–15 carbon atoms in the alkyl group at a temperature of 135–140° C., the reaction being accompanied by formation of by-product water.

4. A mineral lubricating oil containing from .02–1% by weight of an oil soluble acidic reaction product obtained by reacting equal molecular proportions of maleic acid and a mixture of tertiary alkyl primary amines containing 12–15 carbon atoms in the alkyl group at a temperature of 140–150° C., the reaction being accompanied by formation of by-product water.

References Cited in the file of this patent

UNITED STATES PATENTS

| 2,191,738 | Balle | Feb. 27, 1940 |
| 2,490,744 | Trigg et al. | Dec. 6, 1949 |
| 2,594,286 | Bryant et al. | Apr. 29, 1952 |
| 2,604,451 | Rocchini | July 22, 1952 |
| 2,699,427 | Smith et al. | Jan. 11, 1955 |
| 2,718,503 | Rocchini | Sept. 20, 1955 |
| 2,739,871 | Senkus | Mar. 27, 1956 |
| 2,742,432 | Messina | Apr. 17, 1956 |
| 2,742,498 | Smith et al. | Apr. 17, 1956 |
| 2,758,086 | Stuart et al. | Aug. 7, 1956 |
| 2,783,206 | Messina | Feb. 26, 1957 |